(12) United States Patent
Torvinen

(10) Patent No.: US 7,359,724 B2
(45) Date of Patent: Apr. 15, 2008

(54) METHOD AND SYSTEM FOR LOCATION BASED GROUP FORMATION

(75) Inventor: Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 261 days.

(21) Appl. No.: 10/717,992

(22) Filed: Nov. 20, 2003

(65) Prior Publication Data

US 2005/0113123 A1  May 26, 2005

(51) Int. Cl.
*H04B 7/00* (2006.01)

(52) U.S. Cl. .................... 455/518; 455/519; 455/456.2

(58) Field of Classification Search ................ 455/420, 455/418, 419, 456.1, 519, 456.5, 456.2, 518; 370/260; 340/686.6
See application file for complete search history.

(56) References Cited

U.S. PATENT DOCUMENTS

| | | | |
|---|---|---|---|
| 6,553,236 B1* | 4/2003 | Dunko et al. ............. | 455/456.1 |
| 6,975,873 B1* | 12/2005 | Banks et al. ............. | 455/456.5 |
| 2002/0111173 A1* | 8/2002 | Hendrey et al. ............ | 455/456 |
| 2003/0020623 A1* | 1/2003 | Cao et al. ................ | 340/686.6 |
| 2003/0083046 A1* | 5/2003 | Mathis ....................... | 455/412 |
| 2003/0096621 A1* | 5/2003 | Jana et al. .................. | 455/456 |
| 2003/0096628 A1* | 5/2003 | Bar-On et al. .............. | 455/518 |
| 2003/0100326 A1* | 5/2003 | Grube et al. ................ | 455/515 |
| 2003/0186716 A1* | 10/2003 | Dorenbosch et al. ....... | 455/519 |
| 2005/0149443 A1 | 7/2005 | Torvinen | |
| 2005/0210104 A1 | 9/2005 | Torvinen | |
| 2005/0221812 A9* | 10/2005 | Gailey et al. ............ | 455/422.1 |

FOREIGN PATENT DOCUMENTS

EP      1 257 144 A2      11/2002

* cited by examiner

*Primary Examiner*—Danh Le
(74) *Attorney, Agent, or Firm*—Hollingsworth & Funk, LLC

(57) ABSTRACT

In one embodiment, a method and system allows organization terminal (402) to define a group session based upon location and other criteria associated with participating terminals (410). Location criteria may include cell definition (110), group definition (126), and/or sub-group definition (130). Various components (404-408) may be utilized to perform application/location/management functions to determine the qualifications of each terminal of terminal group (410) to join the group. Once terminals (410) have been pre-qualified based upon their location and other group criteria, terminals (410) may accept an invitation to join the location based group session and begin application sharing, group chat sessions, and downloading as required to facilitate the location based group session.

21 Claims, 9 Drawing Sheets

METHOD AND SYSTEM FOR LOCATION BASED GROUP FORMATION

FIELD OF THE INVENTION

This invention relates in general to group formation, and more particularly to group formation using location services.

BACKGROUND OF THE INVENTION

Service enablers are the basic technology building blocks for creating mobile services. The implementation of service enablers can potentially take place in many places along the end-to-end chain, i.e., from the mobile terminal to the fixed network server. Many new service enablers are needed to produce compelling new services and enable the next growth wave for the mobile industry.

The concept of enabling services has largely been perceived between a single service subscriber and a single content server. Often, multiple service subscribers are in need of a single service, where individual sessions between each subscriber and the content server are required. As such, large amounts of resources such as memory and transmission bandwidth are needlessly consumed from the server, since each subscriber requiring service additively drains the server's resources.

Many service enablers in existence today could be more effective and thus provide the subscriber with a richer experience, if they could be offered and managed in a group fashion. For example, any situation where groups of people are gathered together, whereby common information of interest may be accessed by every member of the group, would enrich his or her user experience by such common information. In such a group situation, service enablers such as browsing, delivery, messaging, content adaptation, chat, downloading, sharing, presence, etc., could be enhanced by the common information.

Inherent with mobile terminals, however, is their capacity to dynamically change their spatial orientation with respect to their surroundings. Due to changing circumstances, therefore, where one particular group orientation may be advantageous at one moment, that same group orientation may cease to be advantageous at the next moment due to member mobility. In other words, there are many situations in which group activity should be conducted in proximity to a region of interest for a fixed amount of time so that stimuli and content may be shared within the region of interest by locally associated group members.

Group tours in museums and group events in local drinking establishments are exemplary situations that are dependent upon local stimuli to determine the way in which one group member interacts with the other group members. For example, supplying a common link to interesting content pertaining to a particular painting that each member of a museum tour is viewing would be a valuable service that could be offered to members of that particular tour group. Alternately, supplying a trivia quiz to patrons at a local pub, whereby prizes are given away for the most correct answers, also requires location dependent membership, e.g., those patrons that are actually present at the pub necessarily care about a trivia quiz administered by the pub.

In the prior art, however, there exists no such mobile component that adaptively creates location based groups for special purposes. Group management has traditionally been coordinated through the use of group management servers, which are fixed within the network. Thus, spontaneous and flexible creation of micro-services has not previously been possible through the use of a mobile terminal acting as the organizer of the location based group.

Accordingly, there is a continuing need in the communications industry for a system and method that exploits the capabilities of mobile terminals to increase the number of value added services/micro-services that may be facilitated through their use. In particular, the capabilities of mobile terminals needs to be exploited, so that they may function alone to provide location based group formation activities, or alternatively, may coordinate with network servers to provide the location based group formation activity.

SUMMARY OF THE INVENTION

To overcome limitations in the prior art, and to overcome other limitations that will become apparent upon reading and understanding the present specification, the present invention discloses a system and method for providing location based group sessions that are organized and managed via a mobile terminal, or a combination of a mobile terminal and various application/management network components.

In accordance with one embodiment of the invention, a method of conducting location based group sessions within a cell based network comprises defining a region of interest using a mobile terminal, where the region of interest is used as a group session area. The method further comprises defining criteria using a mobile terminal, where the criteria is used to determine minimum capabilities required of group attendees. The method further comprises identifying potential group attendees whose location is within the group session area and whose capabilities meet the criteria, and inviting the potential group attendees to join the location based group session.

In accordance with another embodiment of the invention, a group hosting system comprises an organization terminal wirelessly coupled to the group hosting system to define group member criteria for a location based group session, a plurality of mobile terminals wirelessly coupled to the group hosting system, and a group management server coupled to the group hosting system. The group management server is adapted to compare location information and capability information associated with each of the plurality of mobile terminals to the group member criteria. Ones of the plurality of mobile terminals that comply with the group member criteria are then invited to join the location based group session.

In accordance with another embodiment of the invention, a mobile terminal wirelessly coupled to a network which includes a group of mobile terminals wirelessly coupled to the network is provided. The mobile terminal comprises a memory capable of storing at least one of a group session creation module and a group session management module, a processor coupled to the memory and configured by the group session creation module to enable a group criteria definition to be used in pre-qualifying ones of the group of mobile terminals to participate in a group session, and a transceiver configured to facilitate content exchange with participating mobile terminals. The participating mobile terminals are selected from the pre-qualified ones of the group of mobile terminals.

In accordance with another embodiment of the invention, a computer-readable medium having instructions stored thereon which are executable by a mobile terminal for organizing location based group sessions with a group of mobile terminals in a network is provided. The instructions perform steps that comprise defining a session area where the location based group sessions are to be offered, defining criteria to establish minimum capabilities of the group of mobile terminals, and communicating the session area and the criteria to the network. The participating terminals are then selected from the group of mobile terminals that fall within the session area and that meet the minimum capabilities.

In accordance with another embodiment of the invention, an application server is coupled to a network to facilitate a location based group service. The application server comprises means for receiving group service definitions from an organizing terminal wirelessly coupled to the application server, means for communicating the group service definitions to network components, and means for inviting qualifying terminals to join the location based service. The qualifying terminals have previously met the group service definitions as verified by the network components.

In accordance with another embodiment of the invention, a computer-readable medium having instructions stored thereon which are executable by an application server is provided. The instructions perform steps that comprise receiving group session criteria from a wirelessly coupled organizing terminal, exchanging the group session criteria with network components to ascertain participating members of a group session, and receiving content from the wirelessly coupled organizing terminal to share with the participating members of the group session.

In accordance with another embodiment of the invention, a method of conducting a location based group session within a network comprises defining a region of interest using a mobile terminal. The region of interest is used as a group session area. The method further comprises defining criteria using a mobile terminal. The criteria is used to determine minimum capabilities required of group attendees. The method further comprises identifying potential group attendees whose location is within the group session area, and providing the potential group attendees with an address of a server within the network that is hosting the location based group session. The address is then used by the potential group attendees to access the server.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system and method that facilitates formation of groups of mobile terminal users through the use of location services. In the present invention, for example, location services may be realized by location/presence servers, group management functionalities within the network, and/or through applications residing on the mobile terminals themselves. Location based groups may be needed, for example, in situations where groups of people, who may or may not be acquainted with each other, nevertheless wish to form a group with each other for a certain time, purpose, and location.

The present invention allows the creator of the group or organizer of the event to flexibly create event/location based services. Users who participate in the event may easily share information with each member of the group and may also subdivide themselves into sub-groups within the location based group. The group properties may be easily managed, which enables mobile service creation for small groups for increased personalization of services.

In accordance with the present invention, location based group formation may trigger actions, application downloads, services, etc. (hereinafter generally referred to as "applications") that are designed to facilitate the group session. For example, multiple chat groups, internal messaging services, application sharing, and demonstration software downloads, to mention only a few, may be utilized during the location based group session. Other network servers, such as chat servers, Short Messaging Service Centers (SMSC), download servers, etc., may be accessed through standard interfaces to supplement the location based group session.

Figure 1:
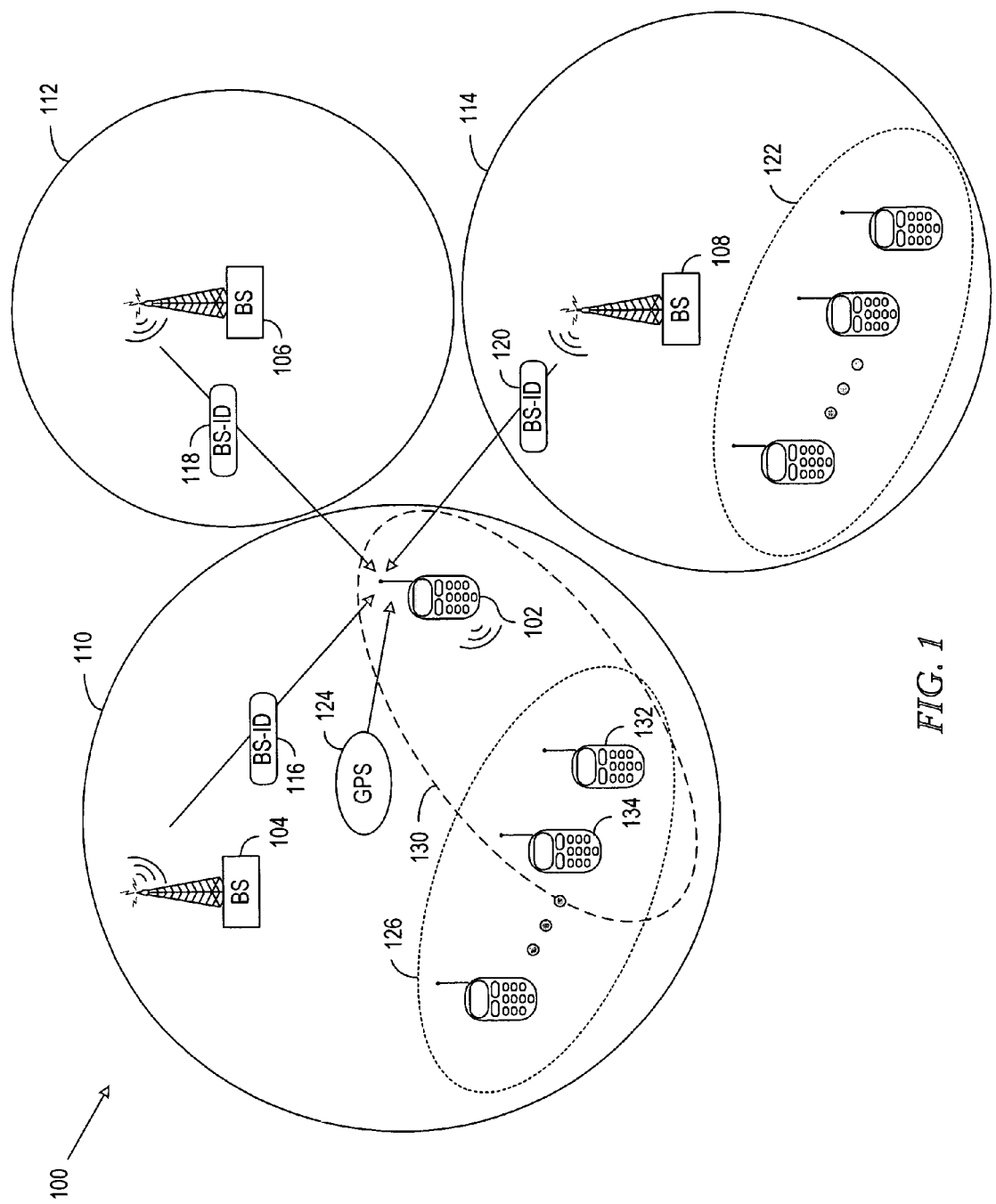
FIG. 1 illustrates an exemplary block diagram of location definition in accordance with the present invention.

FIG. 1 is a block diagram generally illustrating a number of representative examples in which a mobile terminal can perform location based group formation in accordance with the invention. The examples set forth in FIG. 1 are provided as representative examples to facilitate an understanding of this aspect of the present invention, however it should be recognized that the present invention is not limited to these representative examples.

FIG. 1 depicts a wireless network environment 100, which may include a cellular network such as the Global System for Mobile Communication (GSM). A portion of the description provided in connection with FIG. 1 is described in terms of a cellular network such as GSM, but the principles described herein are equally applicable to other cellular/wireless networks such as, for example, Enhanced Data rate for GSM Evolution (EDGE), Personal Communications Service (PCS), and other current or future cellular network technologies. For purposes of discussion and not of limitation, FIG. 1 will be described in terms of a GSM system.

In a mobile radio network such as a GSM network, the area to be covered is divided into multiple areas, generally referred to as "cells." The mobile radio network is assigned a set of frequencies, and each cell is assigned one (or more) of these frequencies. Neighboring cells will not use the same frequencies, and frequencies are re-used only where the distance is sufficiently large as to avoid interference. When a mobile terminal moves from one cell to another, an automatic channel/frequency change will occur, which is generally referred to as "handoff" or "handover." There are different manners in which such handover may be realized, such as network-based handover, mobile-based handover, and mobile-assisted handover.

In general, a GSM network includes a number of primary subsystems, including a radio subsystem (RSS), a switching subsystem (SS), and an operation subsystem (OSS). The SS connects the wireless network with other networks such as standard public networks, performs handovers between different Base Station Subsystems (BSSs), includes worldwide user location functions, and supports charging, billing, and roaming of users between different service providers. The SS includes elements such as a Mobile Services Switching Center (MSC), a Home Location Register (HLR), Visitor Location Register (VLR), and other elements known in the art. The OSS provides functions for network operation and maintenance, and includes elements such as an Operation and Maintenance Center (OMC), Authentication Center (AuC), Equipment Identity Register (EIR), and other elements known in the art. The SS and OSS, being known in the art and not of particular relevance to the instant discussion, need not described in further detail.

The RSS includes radio-specific elements, such as the mobile terminals and the Base Station Subsystem (BSS). Referring to FIG. 1, a mobile terminal 102 includes the hardware, software, Subscriber Identity Module (SIM), etc. necessary to communicate with the GSM network. The GSM network includes multiple BSSs, each of which is controlled by a Base Station Controller (BSC). The BSS is responsible for maintaining radio connections to the mobile terminals, coding and decoding, etc. The BSS is a logical entity physically implemented via the BSC and a set of Base Transceiver Stations (BTS), commonly referred to simply as Base Stations (BS), that are controlled by the BSC. In FIG. 1, three of the many available base stations are illustrated, including BS 104, 106, 108. Each BS includes the radio equipment, such as antennas, signal processing, amplifiers, etc. used to facilitate the communication between the BSC and the mobile terminals. The wireless area served by a BS is generally referred to as a cell, such that cell 110 is served by BS 104, cell 112 is served by BS 104, and cell 114 is served by BS 108.

In a cellular network such as the exemplary GSM network portion illustrated in FIG. 1, a number of identifiers are used to identify the various network constituents. For example, the mobile terminals 102 are generally associated with an equipment identifier, and the user of the mobile terminal 102 is generally associated with a subscriber identifier (such as that provided by a SIM) as well as with an identifier such as a telephone number. In addition, several other identifiers are defined for managing subscriber mobility and addressing other network elements.

Among these other identifiers are the cell identifier (cell-ID) and the Base Transceiver Station Identity Code (BSIC). To understand these identifiers, it is noted that a GSM network includes various geographic areas, including cells, Location Areas (LAs), MSC/VLR service areas, and Public Land Mobile Network (PLMN) areas. As previously indicated, a cell is the area generally corresponding to a BS radio coverage area, and is identified via the cell-ID. The LA is a group of cells, and corresponds to the area in which subscribers are paged, where paging refers to the act of broadcasting over the setup channel in order to locate a mobile terminal. Each LA is served by one or more BSCs and by a single MSC. Each LA is assigned a location area identity (LAI) number.

Within a particular LA, the individual cells are uniquely identified with a cell-ID. Together with the LAI, cells can be uniquely defined on an international level. As to the BSIC, a unique BSIC is used in order to distinguish neighboring base stations. For example, the BSIC includes a color code within a PLMN referred to as the Network Color Code (NCC), and a Base station Color Code (BCC). The purpose of the color codes is to provide a manner for the mobile terminal to distinguish between two different cells using the same radio transmission frequency. Within the same network, the identification can be performed using the BCC, where overlapping networks further utilize the NCC. The BSIC is broadcast periodically by the base station on the Synchronization Channel (SCH).

Returning to FIG. 1, one embodiment of the invention involves receiving one or more cell-related identifiers at the mobile terminal 102, which can then be used by the mobile terminal 102 to determine approximately in which cell boundary 110 he is located. In particular, the mobile terminal performs signal strength measurements and bit error rate measurements on the received signal on the channel it is currently operating on, as well as signal strength measurements on a list of candidate channels supplied to it by the BS. For example, mobile terminal 102 can perform signal strength measurements for the channel associated with BS 104, as well as other base stations such as BS 106, 108. In this manner, the mobile terminal 102 creates and maintains a list of current base stations that are in range. More particularly, mobile terminal 102 will receive a unique base station identifier 116, such as the cell-ID and/or BSIC, from BS 104, as well as such identifiers 118, 120 from other base stations 106, 108 respectively. This information can be used by a mobile terminal-specific implementation to identify the area served by one or more of the list of base stations. In particular, mobile terminal 102 may ascertain which of cells 110-114 is currently servicing mobile terminal 102 and further may ascertain which of mobile terminal groups 126 or 122 share the same cell with mobile terminal 102. Thus, mobile terminal 102 may perform cell based group formation through inclusion of each active mobile terminal that is currently sharing the same cell, e.g., mobile terminal group 126.

In accordance with another embodiment of the invention, mobile terminal 102 may employ a proximity connection to ascertain which of mobile terminals 126 are within subgroup area 130, e.g., through the use of a Bluetooth connection. Bluetooth is a computing and telecommunications industry specification that describes how mobile phones and other mobile terminals can interconnect with each other and with home and business phones/computers using a short-range wireless connection. A Bluetooth hot spot, e.g., 130, is an area that has a readily accessible wireless network available to multiple terminals within that area, e.g., mobile terminals 132-134 and 102. Thus, each of mobile terminals 132 and 134 having similar Bluetooth capability that fall within sub-group area 130 may be identified by mobile terminal 102 as potential participants in the group activity. Other implementations of proximity connections may be utilized to define sub-group 130, such as Wireless Local Area Network (WLAN) or InfraRed (IR) for example, and are not necessarily limited to a Bluetooth application.

Figure 2:
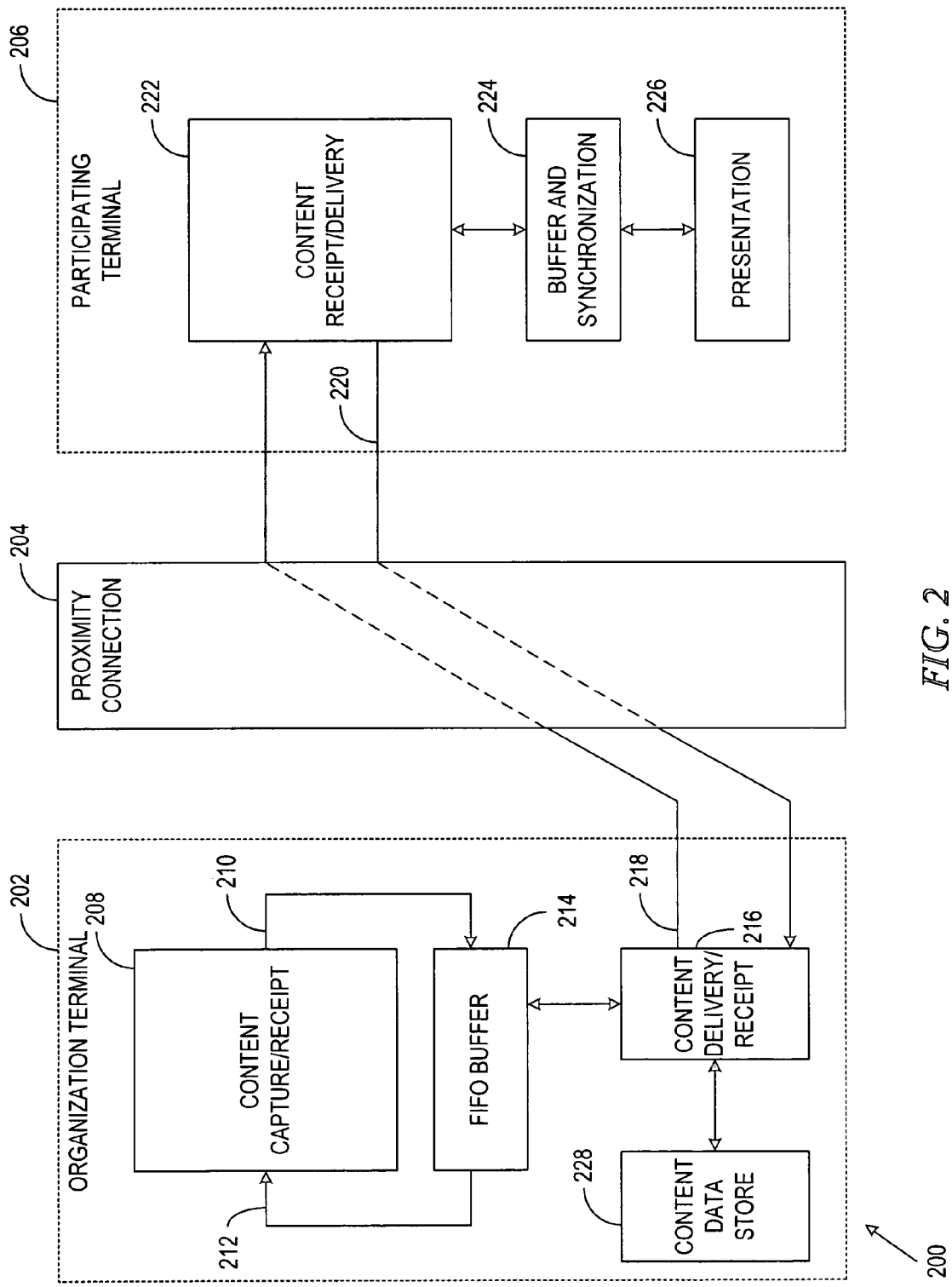
FIG. 2 illustrates an exemplary proximity connection between an organizing terminal and a participating terminal in accordance with the present invention.

Proximity connections established within region of interest 130 may be utilized to provide a variety of services, applications, demonstrations, promotions, etc., that are guided or managed by proximately coupled organizing terminal 102. FIG. 2 illustrates block diagram 200 illustrating organization terminal 202, e.g., mobile terminal 102 of FIG. 1, arranged to exchange data to participating terminal 206, e.g., mobile terminals 132-134, via data paths 218 and 220 during the established group session. The nature of the data transfer may be of any type and rate that is supported by proximity connection 204, organization terminal 202 and participating terminal 206. One of ordinary skill in the art will recognize that any data type may be supported by such an arrangement. The data, for example, may be synchronization data that is transferred by organization terminal 202 to participating terminal 206, in order to obtain a common data store between the two devices via a data synchronization standard such as SyncML. The synchronization data may support such activities as calendar synchronization, contact synchronization, to-do lists, initial download of applications/demonstrations/promotions, etc., as required between organization terminal 202 and participating terminal 206. SyncML may also support data types such as images, files and database objects. It should also be noted, that data transfer from participating terminal 206 may also be received by organization terminal 202. In such an instance, data flow between participating terminal 206 and organization terminal 202 is facilitated through path 220, while acknowledgment of the data receipt is provided by path 218.

In one embodiment according to the present invention, organization terminal 202 may be an image enabled device having content capture/receipt capability 208. In such an embodiment, organization terminal 202 may provide audio/video/messaging signal feeds to one or more participating terminals 206 during, for example, a location based, chat session involving terminals within a region of interest. Data is transferred via path 210 to First-In First-Out (FIFO) buffer 214, where acknowledgement of the content receipt is generated via path 212. FIFO buffer 214 buffers the content blocks, while content delivery/receipt 216 prepares for their subsequent transfer to participating terminal 206 via path 218 through proximity connection 204. Other data content, such as static data content, may be provided by organization terminal 202 from content data store 228. Content data store 228 may provide content previously retrieved from, for example, a content server (not shown).

Path 220 is used by content receipt/delivery 222 to acknowledge receipt of the content from content delivery 216 via proximity connection 204. Buffer and synchronization block 224 is used to provide the proper frame alignment and playback speed as required by presentation 226. Presentation 226 represents any Application Programming Interface (API) that is executing on participating terminal 206 including content processing software in support of group related content consumption activities.

The implementation illustrated in block diagram 200 may be used to support any number of group activities conducted between organization terminal 202 and participating terminals 206. For example, group chat during outdoor concerts or exhibitions may be facilitated to allow data exchange concerning the event such as: opinions relating to the quality of the event from the various group activity members; sharing of event experiences; identification of the "best" places to be within the event; etc.

Other group activities such as a computer fair for youth may be facilitated by the present invention by allowing certain demonstrations and/or promotions to be exchanged between organization terminal 202 and participating terminals 206. For example, all members having group membership to the computer fair may receive a gaming demonstration during an assembly meeting taking place within the computer fair. Thus, each member of the assembly is allowed a fixed amount of time to "try out" the game and then to respond with any feedback that they may have concerning the game, e.g., whether the game was entertaining, too complex, etc.

In another embodiment of the present invention, mobile terminal 102 may define a more detailed description of the location based group formation. For example, mobile terminal 102 may define a particular region of interest so that location based group activities are confined to an area that is defined by the user of mobile terminal 102. The region of interest may be defined by the user in any number of different ways. The region of interest may be defined, for example, by giving the name of the city, or one of the streets in the city, with text or voice input. A known landmark may also be entered to define a region of interest, such as for example, the Stockmann in Finland, or the Leaning Tower of Pisa in Italy. A user may also select a region of interest by viewing a map display of a wide area and pointing to an area within the wide area view and then zooming to the area pointed to. The user may also have access to a positioning system, e.g., GPS 124, used to determine his current position, in which case, his current position not only defines the center of the region of interest to be used, but also defines the outer boundaries of the region of interest to be used. Through the use of GPS or landmark aided region of interest definition, for example, the user of mobile terminal 102 may store coordinates of the region of interest and label them for later usage.

Still in other embodiments, the user may wish to pinpoint a central datum point on a map that is currently within the viewable display of the mobile terminal. In such an instance, the user simply picks the central datum point by selecting a point on the viewed map using a stylus, mouse, or any other suitable pointing device. Once the central datum point is selected, the region of interest may also be selected by the user so as to control the size of the region of interest which surrounds the central datum point. The region of interest may also be defined by simply taking a circumference around the central datum point according to a selectable circumference radius.

Map data representative of the region of interest and surrounding areas may be stored locally within mobile terminal 102, whereby map data is retrieved from local memory. Alternatively, map data representative of the region of interest may not be located locally to the mobile terminal, in which case map data is retrieved from a download server (not shown). The map data may then be displayed to the user via the display of mobile terminal 102, whereby the user is then able to superimpose a region of interest onto the displayed map to define the boundaries of the group session.

In another embodiment according to the present invention, application/location/group management components may be used in combination with a mobile, organizing terminal to perform location based group formation. In such an instance, certain location/capability conditions, enforced by the various server components, must be met before a prospective terminal is allowed into the group. Once the conditions have been met by the prospective group members, their potential attendance may then be reported to the application/location/group management components for further processing. An exemplary network that may be used to manage such location/capability/management information is Session Initiation Protocol (SIP) network 300 of FIG. 3.

Figure 3:
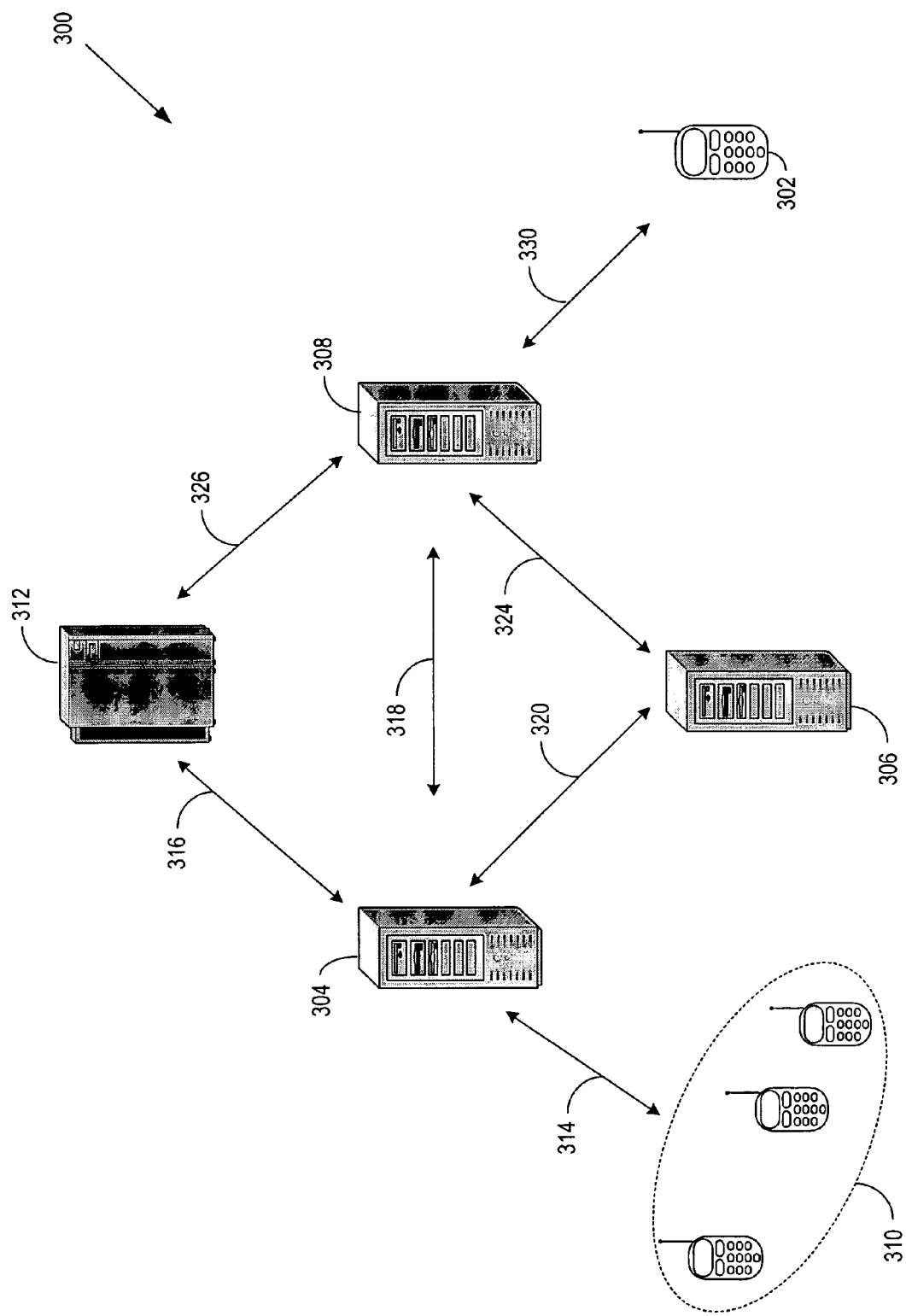
FIG. 3 illustrates an exemplary Session Initiation Protocol (SIP) network in accordance with the present invention.

FIG. 3 illustrates an exemplary SIP network according to the principles of the present invention, in which location/capability information associated with, for example, prospective group terminals 310 may be provided to SIP server 308 in order to facilitate a grouping decision. Elements of a SIP enabled network include user agents, e.g. mobile terminals 302 and 310, SIP servers 304 and 308, location server 306, and capability server 312. User agents are the end devices in a SIP network and they originate SIP requests to establish media sessions to send and receive media. Each user agent comprises a user agent client that initiates requests and a user agent server that generates the responses to the requests.

SIP servers 304 and 308 are servers that assist user agents in session establishment and other functions. SIP servers may represent a SIP proxy that receives SIP requests from a user agent, via paths 314 or 330, or another proxy, via path 318, and forwards the request to another location. SIP servers may also represent a redirect server that receives a request from a user agent or proxy and returns a redirection response indicating where the request should be retried. SIP servers may also represent a registrar server that receives SIP registration requests and updates the user agent's information into a location server, e.g., 306, or other database, via paths 320 or 324. SIP servers 304 and 308 may also access capability information from capability server 312 via paths 316 and 326 associated with either of user agents 302 and/or 310 according to their respective access privileges defined by their user agent profiles.

Servers 304-308 and 312, for example, may be operated as location/capability/management components used to facilitate location based group formation decisions in accordance with the present invention. Conditional attendance into a group session may be monitored by SIP server 308 through analysis of various features associated with prospective group terminals 310. In particular, SIP server 308 may issue an OPTIONS message to SIP server 304 in order to ascertain any pertinent options or capabilities that are associated with prospective group terminals 310. Once the request is authenticated, SIP server 304 may access capability server 312 to retrieve the requested information. Once received, SIP server 304 then forwards the requested information to SIP server 308, where the capabilities associated with prospective group terminals 310 may be compared to attendance criteria predefined by organizing terminal 302.

Any number of conditional attendance parameters may be used to ascertain conditional attendance to a group session. Terminal capabilities, such as streaming capability, may be a pre-requisite to allow a prospective terminal to join a group session so that efficient data communication between group members may be insured. Terminal type, e.g., gaming enabled terminals, may also be a required capability to join, for example, a location based gaming demonstration. Such a prerequisite might be enforced in order to insure that all members of the group are compatible with the gaming demonstration that is offered within a particular group session. Location of each prospective terminal 310 may be another parameter accessed by SIP server 308 from, for example, location server 306 to further condition the acceptance into the group session. Any of prospective group terminals 310 conforming to the conditional criteria imposed by organizational terminal 302 may then be used to generate a prospective group member list, from which a group session may be formed.

Group sessions may be formed using a number of various methods according to the present invention. In a first exemplary embodiment, notification network 400 of FIG. 4 may be used to implement group participation through notification. Organization terminal 402 is in communication with application server 406 via path 430, where application server 406 provides services and applications in support of the location based group session, which is defined by organization terminal 402. Location server 404 maintains information associated with the location of participating terminals 410 provided via path 416 and compares the location information with location criteria that is provided from application server 406 via path 412. Locations of participating terminals 410 meeting the location criteria provided by application server 406 are then reported to group management server 408 via path 426 as a prospective group member list.

Figure 4:
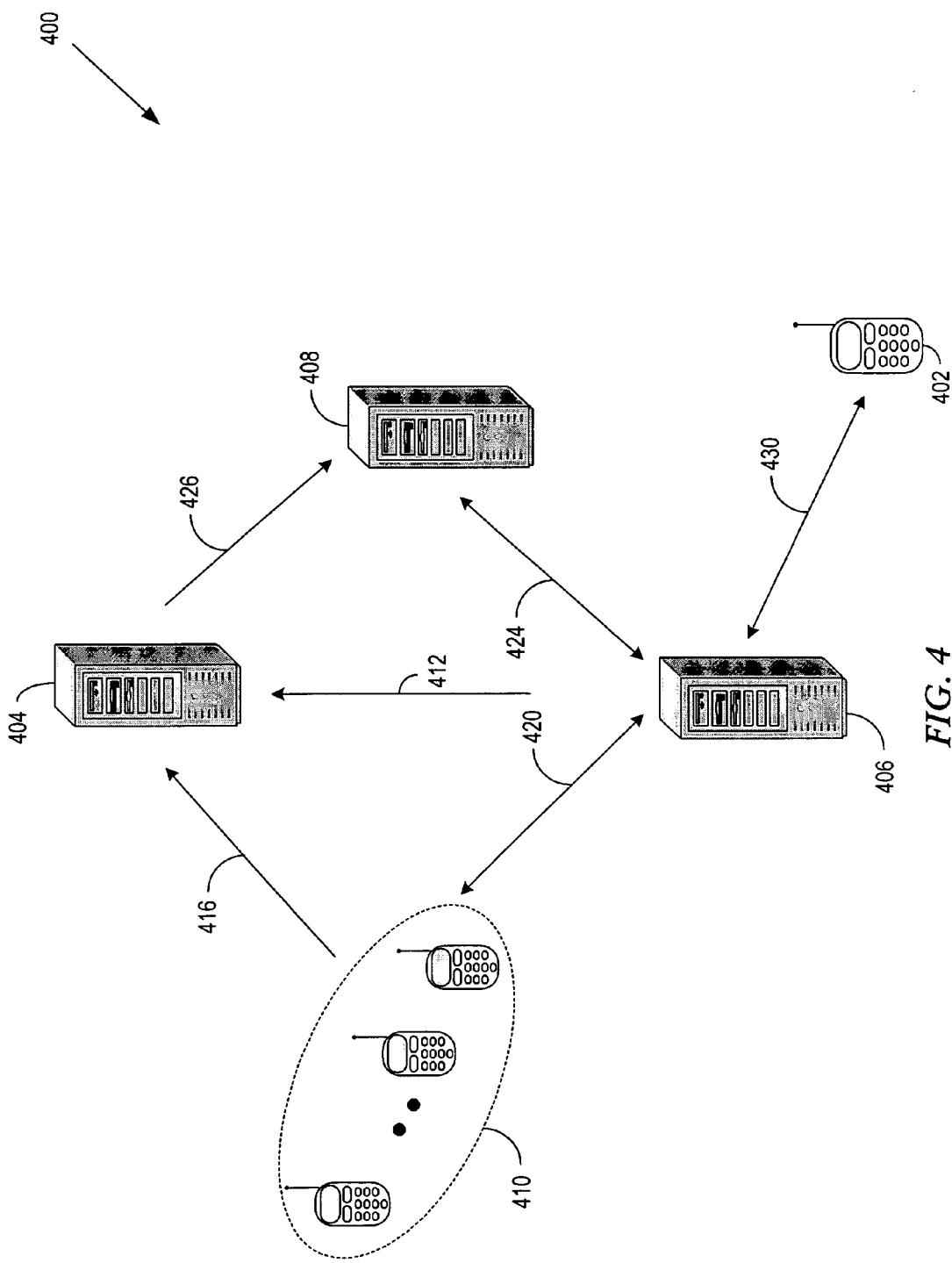
FIG. 4 illustrates an exemplary notification network in accordance with the present invention.
Figure 5:
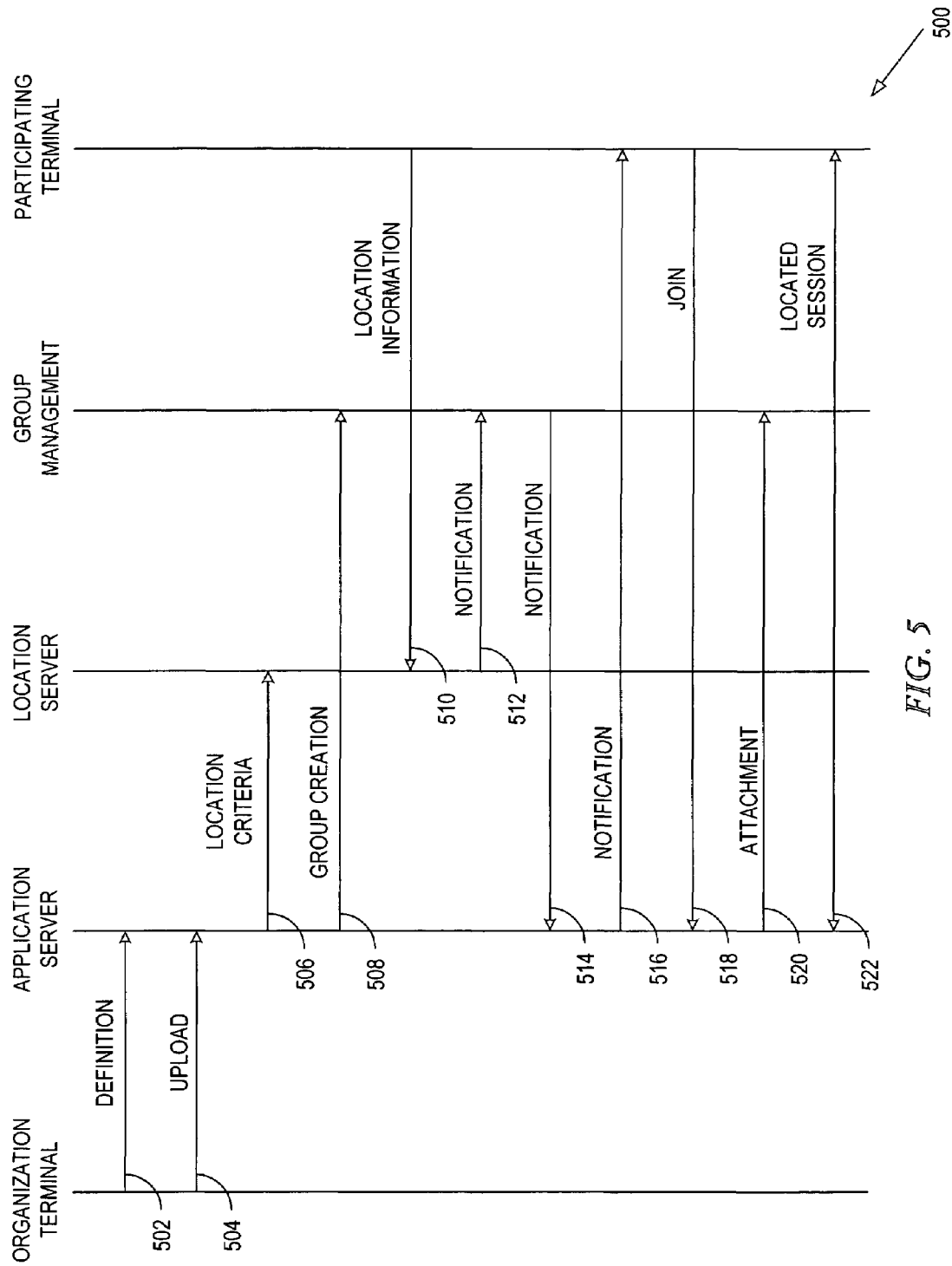
FIG. 5 illustrates an exemplary message flow diagram in accordance with the present invention.

In order to illustrate an exemplary session invitation by notification flow in accordance with the present invention, message flow 500 of FIG. 5 is provided and is explained in relation to notification network 400 as illustrated in FIG. 4. In message 502, organization terminal 402 provides a definition of the region of interest to be used for the location based group function to application server 406 via path 430. Many methods of defining the region of interest may be used as discussed previously, which may include a cell based location definition, e.g., cell 110, or proximity connections to define location, e.g., 130, which may include such technologies as Bluetooth, WLAN, or IR to name only a few. Other methods of defining the region of interest may involve data generated by organization terminal 402 via landmark based definitions, map based definitions, or GPS aided location definitions. The definition of the region of interest may be established as a group formation criteria to be enforced as a prerequisite to group membership as well as defining boundaries to be enforced during the group session.

Message 502 may also include a temporal restriction as another group formation criterion, which specifies a start time and an end time that the location session may be valid. For example, organization terminal 402 may specify a two day time interval in which the group session may be active. Any of participating terminals 410 meeting the region of interest criteria may then join the group during the valid time interval, assuming that other group formation criteria, if any, have been met. Group characteristics may also be defined by organization terminal 402 and included within message 502. Such group characteristics may include: group privileges, group types, group member capabilities, group notification specification and management rules. An exemplary definition of the group characteristics is illustrated in Table 1.

TABLE 1

| Group Characteristic | Attribute |
| --- | --- |
| Privilege | Administrative |
|  | General User |
| Group Type | Chat |
|  | Demonstration |
| Service Structures | Various chat groups/rooms |
|  | Application sharing structures and conditions |
| Group Member Capabilities | Image enabled |

TABLE 1-continued

| Group Characteristic | Attribute |
| --- | --- |
|  | Gaming enabled |
|  | SIP enabled |
|  | SMS/MMS enabled |
| Notification Specification | Time of contact |
| Management Rules | Enforcement of group formation criteria |

Group privileges may be assigned to the members of the location based group, giving for example, administrative privileges to organization terminal 402, while participating terminals 410 receive a reduced "general user" privilege. The group type, e.g., chat and/or demonstration, may also be assigned by organization terminal 402 to help participating terminals in their decision to join the group. For example, those terminals that do not wish to participate in a demonstration would decline the invitation based upon a "demonstration" group type. Various service structures may also be defined by organization terminal 402 to allow support mechanisms to be used during the location based session. For example, a definition of the various chat groups/rooms that may be used by the qualifying terminals 410 may be preset for use. Further, application sharing structures and rules/conditions may be imposed by organization terminal 402, which are to be enforced during the location based group session.

Minimum group member capabilities may also be assigned to the group characteristics to aid in matching the group to its member's capabilities. For example, instant messaging (IM) may potentially be required during the group session. In such an instance, only those terminals having SIP capability, assuming SIP is used as the IM transport, should be allowed into the group. Still other messaging formats, such as the Short Messaging Service (SMS) or the Multimedia Messaging Service (MMS) may be required to facilitate group formation/management and could therefore be enforced as a necessary group formation criteria. Other group scenarios, such as a demonstration scenario, may require the member constituents to possess gaming and/or imaging capability to facilitate the demonstration.

A notification specification may be used by organization terminal 402 as a means to define when a participating terminal is notified as to the group formation. For example, the notification specification may set forth a method whereby each qualifying terminal within the region of interest is notified immediately upon entering into the region of interest. Conversely, the notification specification may require a certain period of time after the qualifying terminal has entered the region of interest before the qualifying terminal is notified of the location based group formation.

Management rules may also be specified by organization terminal 402, whereby group management server 408 is established as the enforcing entity of such management rules. For example, group management server 408, in conjunction with location server 404, may continuously monitor the location of each of participating terminals 410 during the location based group session, such that if any of participating terminals 410 falls outside the region of interest, an alert message may be sent to the errant terminal. Such a management feature would be advantageous for security reasons, for example, during a children's group tour of a museum. In such an instance, if any of the children stray beyond the boundaries of the region of interest previously defined by the organization terminal, then an audible/visual/ tactile alert may be sent to the errant terminal, so that the child may be encouraged to rejoin the group. Additionally, an alert may be sent to any other terminal within the group session, informing the terminal that a child is outside of the region of interest and further providing the terminal with indicia associated with the child, e.g., name, age, physical characteristics, etc.

In message 504, organization terminal 402 may upload any content to application server 406 via path 430 that may be applicable during the location based group session. For example, a gaming demonstration may be uploaded to application server 406 for subsequent distribution to any of qualifying terminals 410 during the group session. Alternatively, organization terminal 402 may simply instruct application server 406 as to the location, e.g., Uniform Resource Identifier (URI), of the gaming demonstration. Once instructed, application server 406 may then access the provided URI to download the gaming demonstration from the appropriate content server (not shown). In message 506, the predefined location criteria, e.g., region of interest as discussed above, and any other group criteria is communicated to location server 404 from application server 406 via path 412, so that a precise definition of the valid session area and group requirements may be set.

In message 508, application server 406 communicates all group creation criteria to group management server 408, such as for example, the valid session area to be enforced for qualification of terminals to the group as well as maintenance of the qualifying terminals while in the valid group session. Additionally, group characteristics such as those exemplified in Table 1 may be transmitted to group management server 408 to further enforce member qualifications. Location information is communicated by participating terminals 410 to location server 404 in message 510. In an alternate embodiment, location server 404 may simply subscribe to a location service, whereby server 404 is provided with location information associated with terminals 410.

As participating terminals 410 fall within the predefined region of interest, notification 512 is issued to group management server 408. Notification 512 indicates to group management server 408 that a terminal has entered into the valid session area and, therefore, is considered to be a potentially viable member of the location based group session. The terminal may be identified, for example, by any number of identification types, such as its Mobile Station Integrated Services Digital Network (MSISDN) number, International Mobile Subscriber Identity (IMSI), or International Mobile Station Equipment Identity (IMEI) to name only a few. Once identification has been made of the terminal, group management server 408 then performs a filtering process, whereby the terminal is subjected to the other group formation criteria associated with the group. Those terminals that are compliant with the group formation criteria are then communicated to application server 406 via message 514.

In message 516, application server 406 communicates with any one or all of terminals 410 that qualify to participate in the group session. The notification to qualifying terminals may include an invitation to the group session, via any messaging capabilities available to application server 406 and terminals 410, such as SMS, MMS, IM, SIP notify, etc. Those qualifying terminals that wish to join the group session, respond in the affirmative via message 518 to the group session invitation of message 516 that was issued by application server 406. Application server 406 then requests, via message 520, that the accepting terminals within group 410 be attached to the group created by message 508. Once attached, accepting terminals within group 410 are able to participate in the location based session through application sharing, chat group participation, etc., as indicated in message 522.

Figure 6:
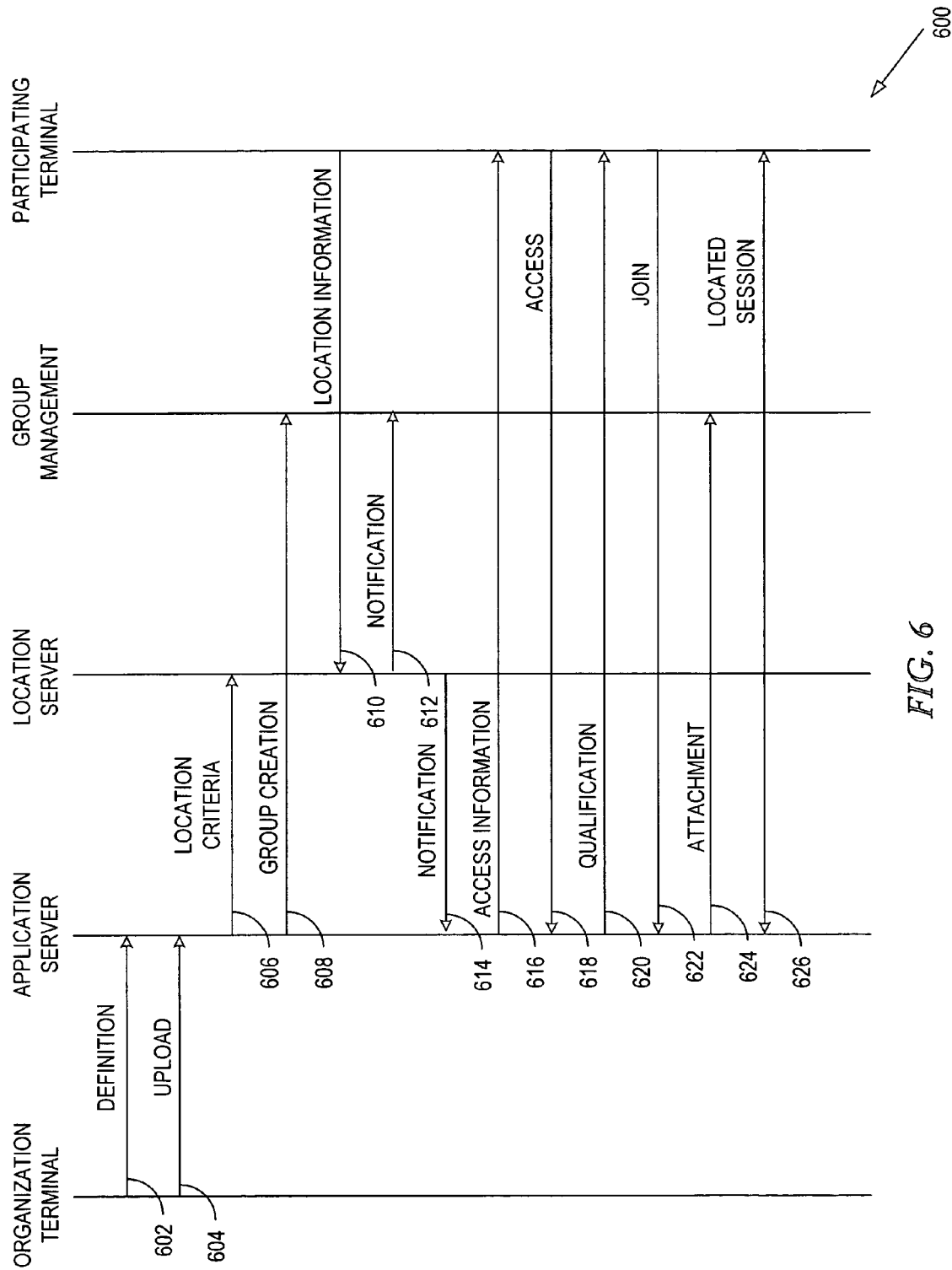
FIG. 6 illustrates an alternate message flow in accordance with the present invention.

In an alternate embodiment according to the principles of the present invention, participants wishing to join a group session are vectored to a location, e.g., a Uniform Resource Locator (URL), where the session may be hosted. Exemplary message flow 600 of FIG. 6 illustrates one embodiment of location based group formation where session invitations are offered to participating terminals through the use of external information, e.g., a Web site location where the session will be hosted.

Messages 602-610 are similar to messages 502-510 as discussed above in relation to FIG. 5. In messages 612 and 614, notifications are communicated to group management server 408 and application server 406 concerning the location information associated with terminals 410. Once knowledge of the location of terminals 410 is known, application server 406 may provide access information, e.g., a Web site URL, to all terminals 410 that may fall within the region of interest. Such access information is communicated via message 616 and is necessary to allow terminals 410 to access the group session hosting server, e.g., application server 406. The access information may contain, for example, the URL of the website hosted by application server 406, or any other content/application server within the network that is accessible via URL, IP address, etc.

Message 618 represents any access attempts by terminals 410 to application server 406 that are in response to receiving the access information concerning the hosting server. It should be noted that only those terminals within the region of interest are provided with the access information, so that unnecessary interruptions of terminals outside the region of interest may be avoided. Access message 618 may contain any information that may be required by application server 406 to make a determination as to whether the requesting terminal has access rights to the group session. For example, the requesting terminal may provide capability information such as access password, display type, gaming capability, imaging capability, messaging capability, audio/video streaming capability, etc. as may be necessary to facilitate the group session. Application server 406 may then either qualify or disqualify the requesting terminal based on whether the capability information supplied by the requesting terminal meets the minimum requirements for the group session as defined by organization terminal 402. The qualification results are then delivered to the requesting terminal in message 620, whereby the requesting terminal is either granted or denied access to the group hosting server. If access is granted, then the requesting terminal may elect to join the group as in message 622. The requesting terminal is then added to the group, via message 624, as managed by group management server 408. The requesting terminal is then granted access to the located session hosted by application server 406 and may interact with the group session through application sharing, chat groups, etc. as in message 626.

Figure 7:
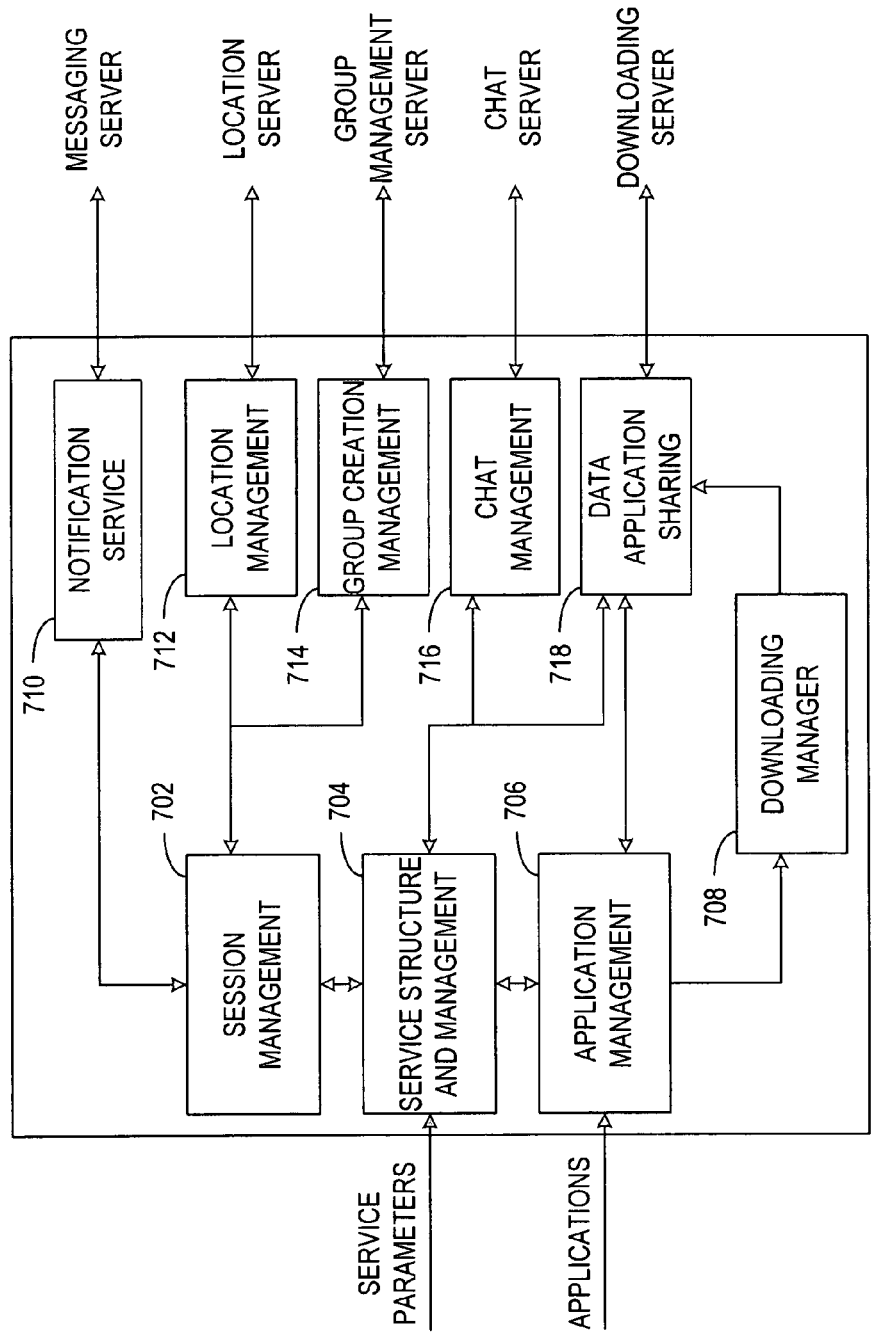
FIG. 7 illustrates a block diagram of an application server in accordance with the present invention.

Application server 406 may be exemplified by block diagram 700 of FIG. 7, in which components of application server 406 are exemplified in one embodiment according to the present invention. Service structure and management component 704 receives service parameters from, e.g., organization terminal 402. The service parameters may represent such location based group formation criteria as, for example, region of interest, session interval and mode of contact for participants. Application management component 706 may receive application uploads from organization terminal 402 consisting of, for example, demonstration software, application sharing applications, gaming applications, chat group definitions, etc.

Such uploads may also consist of a URI that may be communicated to downloading manager 708 and subsequently to data application sharing component 718. Through the use of the URI, data application sharing component 718 may communicate with various downloading, Digital Rights Management (DRM), MMS, or streaming servers that may be in communication with application server 700. In this way, content may be downloaded to application server 700 from locations within the network that is identified by the URI and subsequently shared with any of participating terminals 410 that may have qualified to participate in the location based group activity. Service structure and management component 704 may also communicate with chat management component 716 in order to facilitate coordination with a chat server or an Instant Messaging and Presence Server (IMPS).

Once service parameters associated with the location based group session have been defined, application server 700 maintains communication with location manager, e.g., 404, via location management component 712. In particular, a valid group session area, for example, may be established to define a first criteria for group membership based upon the predetermined region of interest previously communicated by organization terminal 402. Once one or more of terminals 410 has pre-qualified for and accepted attendance to the group, group creation management component 714 contacts the group management server, e.g., 408, as to the identity of the terminals that will be taking part in the group session. The identity may be communicated, for example, as any one of MSISDN number, IMSI, or IMEI and may further be used by the location server to monitor the participating terminals' location to insure that the participating terminals remain within the valid group session area. Once the session has begun, session management component 702 interacts with notification service component 710, location management service 712, and group creation management component 714 to facilitate management of the location based group session.

Notification service 710 may communicate via any number of messaging services such as SMS, MMS, and/or IM to communicate with participating terminals 410. For example, once participating terminals 410 have arrived within the valid session area, a message may be transmitted, informing them of the available services that may be available to them due to their location. Each of participating terminals 410 may then either accept or reject the invitation to the location based service via the same messaging service that was used for the invitation. Further, notification service 710 may be utilized to help manage the group session once it has been formed. For example, if the participating terminals stray outside of the valid group session area, notification service 710 may be used, for example, to provide a message to the errant terminal and optionally to one or more of the other participating terminals as to the non-compliant position of the errant terminal. Notification service 710 may thus be used as an enforcement device to police adherence to the valid group session area.

Figure 8:
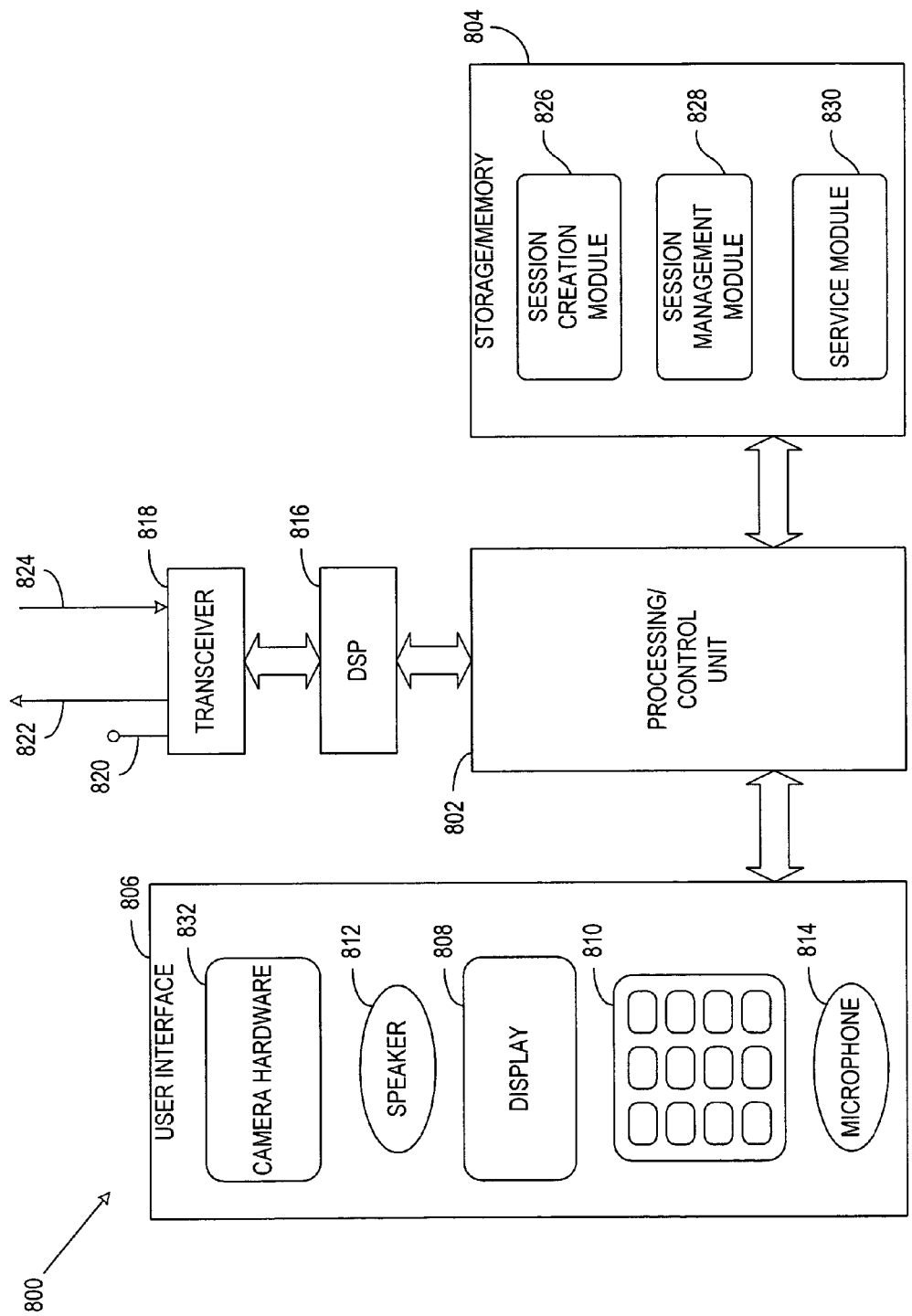
FIG. 8 illustrates a representative mobile computing arrangement suitable for initiating and managing group session functionality in accordance with the present invention.

The invention is a modular invention, whereby processing functions within either a mobile terminal or a hardware platform may be utilized to implement the present invention. The mobile terminals may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various group session functions described herein. An example of a representative mobile terminal computing system capable of carrying out operations in accordance with the invention is illustrated in FIG. 8. Those skilled in the art will appreciate that the exemplary mobile computing environment 800 is merely representative of general functions that may be associated with such mobile devices, and also that landline computing systems similarly include computing circuitry to perform such operations.

The exemplary mobile computing arrangement 800 suitable for location based group session functions in accordance with the present invention may be associated with a number of different types of wireless devices. The representative mobile computing arrangement 800 includes a processing/control unit 802, such as a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile terminal, and also those functions associated with the present invention as dictated by session creation module 826, session management module 828, and service module 830 available in the program storage/memory 804. Thus, the processing unit 802 is capable of defining and managing location based group session functions associated with the present invention, and is further able to participate in the group service via service module 830. The program storage/memory 804 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 804 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 800 via data signals, such as being downloaded electronically via one or more networks, such as the Internet and an intermediate wireless network(s).

The processor 802 is also coupled to user-interface 806 elements associated with the mobile terminal. The user-interface 806 of the mobile terminal may include, for example, a display 808 such as a liquid crystal display, a keypad 810, speaker 812, camera hardware 832, and microphone 814. These and other user-interface components are coupled to the processor 802 as is known in the art. Other user-interface mechanisms may be employed, such as voice commands, switches, touch pad/screen, graphical user interface using a pointing device, trackball, joystick, or any other user interface mechanism.

The mobile computing arrangement 800 also includes conventional circuitry for performing wireless transmissions. A digital signal processor (DSP) 816 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 818, generally coupled to an antenna 820, transmits the outgoing radio signals 822 and receives the incoming radio signals 824 associated with the wireless device.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a location based group formation/hosting system and method in accordance with the present invention.

Figure 9:
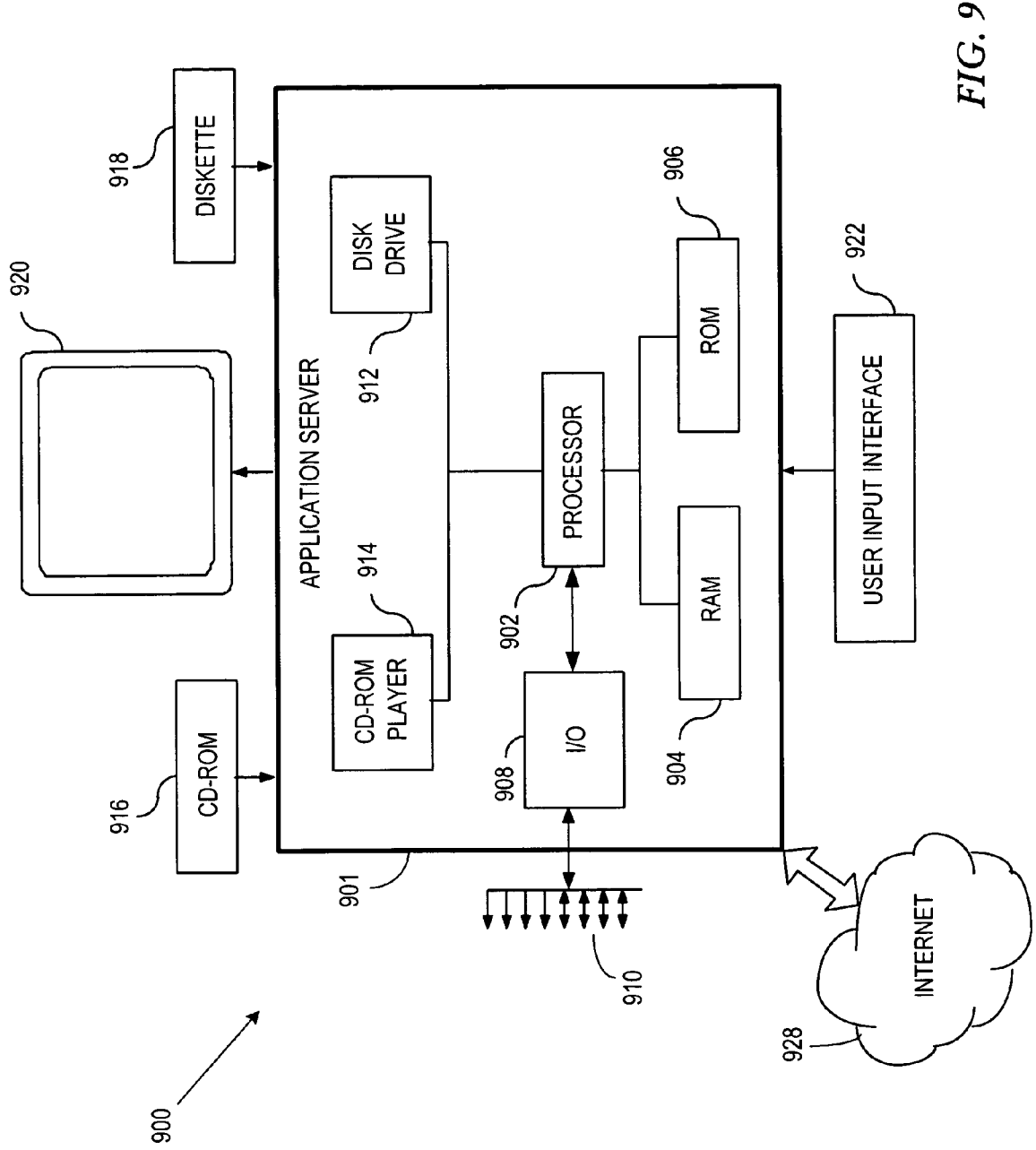
FIG. 9 is a representative computing system capable of carrying out application server assisted functions according to the present invention.

The application servers or other systems for providing server functions in connection with the present invention may be any type of computing device capable of processing and communicating digital information. The server platforms utilize computing systems to control and manage the location based group activity. An example of a representative computing system capable of carrying out operations in accordance with the invention is illustrated in FIG. 9. Hardware, firmware, software or a combination thereof may be used to perform the various location based group session functions and operations described herein. The computing structure 900 of FIG. 9 is an example computing structure that can be used in connection with such an application server platform.

The example computing arrangement 900 suitable for performing the application server activity in accordance with the present invention includes application server 901, which includes a central processor (CPU) 902 coupled to random access memory (RAM) 904 and read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. For example, data received from I/O connections 908 or Internet connection 928 may be processed in accordance with the present invention. External data storage devices may be coupled to I/O circuitry 908 to facilitate application server functions according to the present invention. Alternatively, such databases may be locally stored in the storage/memory of application server 901, or otherwise accessible via a local network or networks having a more extensive reach such as the Internet 928. The processor 902 carries out a variety of functions as is known in the art, as dictated by software and/or firmware instructions.

Application server 901 may also include one or more data storage devices, including hard and floppy disk drives 912, CD-ROM drives 914, and other hardware capable of reading and/or storing information such as DVD, etc. In one embodiment, software for carrying out the assistance operations in accordance with the present invention may be stored and distributed on a CD-ROM 916, diskette 918 or other form of media capable of portably storing information. These storage media may be inserted into, and read by, devices such as the CD-ROM drive 914, the disk drive 912, etc. The software may also be transmitted to application server 901 via data signals, such as being downloaded electronically via a network, such as the Internet. Application server 901 is coupled to a display 920, which may be any type of known display or presentation screen, such as LCD displays, plasma display, cathode ray tubes (CRT), etc. A user input interface 922 is provided, including one or more user interface mechanisms such as a mouse, keyboard, microphone, touch pad, touch screen, voice-recognition system, etc.

Application server 901 may be coupled to other computing devices, such as the landline and/or wireless terminals via a network. The server may be part of a larger network configuration as in a global area network (GAN) such as the Internet 928, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method of conducting location based group sessions within a cell based network, comprising:
    defining a region of interest using a mobile terminal, the region of interest being used as a group session area;
    defining criteria using a mobile terminal, the criteria being used to determine minimum capabilities required of group attendees;
    identifying potential group attendees whose location is within the group session area and whose capabilities meet the criteria; and
    inviting the potential group attendees to join the location based group session.

2. The method according to claim 1, wherein defining the region of interest comprises using a cell definition of the cell based network as the boundaries of the group session area.

3. The method according to claim 1, wherein defining the region of interest comprises using a proximity connection to define the boundaries of the group session area.

4. The method according to claim 1, wherein defining the region of interest comprises:
    selecting a datum point from a display of surrounding area relative to the mobile terminal; and
    defining a circumference relative to the datum point to define the group session area.

5. The method according to claim 1, wherein defining the region of interest comprises:
    selecting a datum point associated with a landmark; and
    defining a circumference relative to the landmark to define the group session area.

6. The method according to claim 1, wherein identifying potential group attendees whose location is within the group session area comprises:
    submitting the region of interest to a location server;
    receiving location updates associated with the potential group attendees from the location server; and
    identifying the potential group attendees whose location lies within the region of interest.

7. The method according to claim 1, further comprising receiving acceptance responses from ones of the potential group attendees to join the location based group session.

8. The method according to claim 7, wherein the accepting ones of the potential group attendees are attached to the location based group session.

9. The method according to claim 8, wherein attaching to the location based group session comprises:
    sharing content between the mobile terminal and the accepting ones of the potential group attendees; and
    monitoring the location of the mobile terminal and the accepting ones of the potential group attendees to insure continued conformance to the group session area.

10. A group hosting system, comprising:
    an organization terminal wirelessly coupled to the group hosting system to define group member criteria for a location based group session;
    a plurality of mobile terminals wirelessly coupled to the group hosting system; and
    a group management server coupled to the group hosting system, the group management server adapted to compare location information and capability information associated with each of the plurality of mobile terminals to the group member criteria, wherein ones of the plurality of mobile terminals that comply with the group member criteria are invited to join the location based group session.

11. The group hosting system according to claim 10, further comprising a location server adapted to maintain location information associated with the plurality of mobile terminals and coupled to provide the location information to the group management server.

12. The group hosting system according to claim 11, further comprising an application server coupled to receive the group member criteria and coupled to provide the group member criteria to the location server and the group management server.

13. The group hosting system according to claim 10, wherein the application server is further coupled to receive content from the organization terminal and is adapted to share the content with ones of the plurality of mobile terminals having accepted the invitation to join the location based group session.

14. A mobile terminal capable of being wirelessly coupled to a network which includes a group of mobile terminals capable of being wirelessly coupled to the network, the mobile terminal comprising:
- a memory capable of storing at least one of a group session creation module and a group session management module;
- a processor coupled to the memory and configured by the group session creation module to enable a group criteria definition, including a location criterion and a terminal capability criterion, to be used in pre-qualifying ones of the group of mobile terminals to participate in a group session; and
- a transceiver configured to facilitate content exchange with participating mobile terminals, the participating mobile terminals being selected from the pre-qualified ones of the group of mobile terminals.

15. The mobile terminal according to claim 14, wherein the transceiver is further configured to exchange the group criteria definition with an application server.

16. A computer-readable medium having instructions stored thereon which are executable by a mobile terminal for organizing location based group sessions with a group of mobile terminals in a network by performing steps comprising:
- defining a session area where the location based group sessions are to be offered;
- defining criteria to establish minimum capabilities of the group of mobile terminals; and
- communicating the session area and the criteria to the network, wherein participating terminals are selected from the group of mobile terminals that fall within the session area and that meet the minimum capabilities.

17. The computer-readable medium according to claim 16, further comprising instructions to perform steps comprising exchanging data with the participating terminals during a predefined time duration of location based group sessions.

18. The computer-readable medium according to claim 16, further comprising instructions to perform steps comprising receiving messages associated with the location of the participating terminals.

19. An application server coupled to a network to facilitate a location based group service, the application server comprising:
- means for receiving group service definitions, including a terminal capability criterion, from an organizing terminal wirelessly coupled to the application server;
- means for communicating the group service definitions to network components; and
- means for inviting qualifying terminals to join the location based service, the qualifying terminals having previously met the group service definitions as verified by the network components.

20. The application server according to claim 19, further comprising means for exchanging content with the organizing terminal and ones of the qualifying terminals having accepted the invitation to join the location based service.

21. A computer-readable medium having instructions stored thereon which are executable by an application server by performing steps comprising:
- receiving group session criteria, including a location criterion and a terminal capability criterion, from a wirelessly coupled organizing terminal;
- exchanging the group session criteria with network components to ascertain participating members of a group session; and
- receiving content from the wirelessly coupled organizing terminal to share with the participating members of the group session.

* * * * *